Feb. 8, 1949.  E. B. COLE  2,461,371
DISTILLATION OF AQUEOUS ALCOHOL
EXTRACTS OF MAHOGANY SULFONATES
Filed Nov. 1, 1947
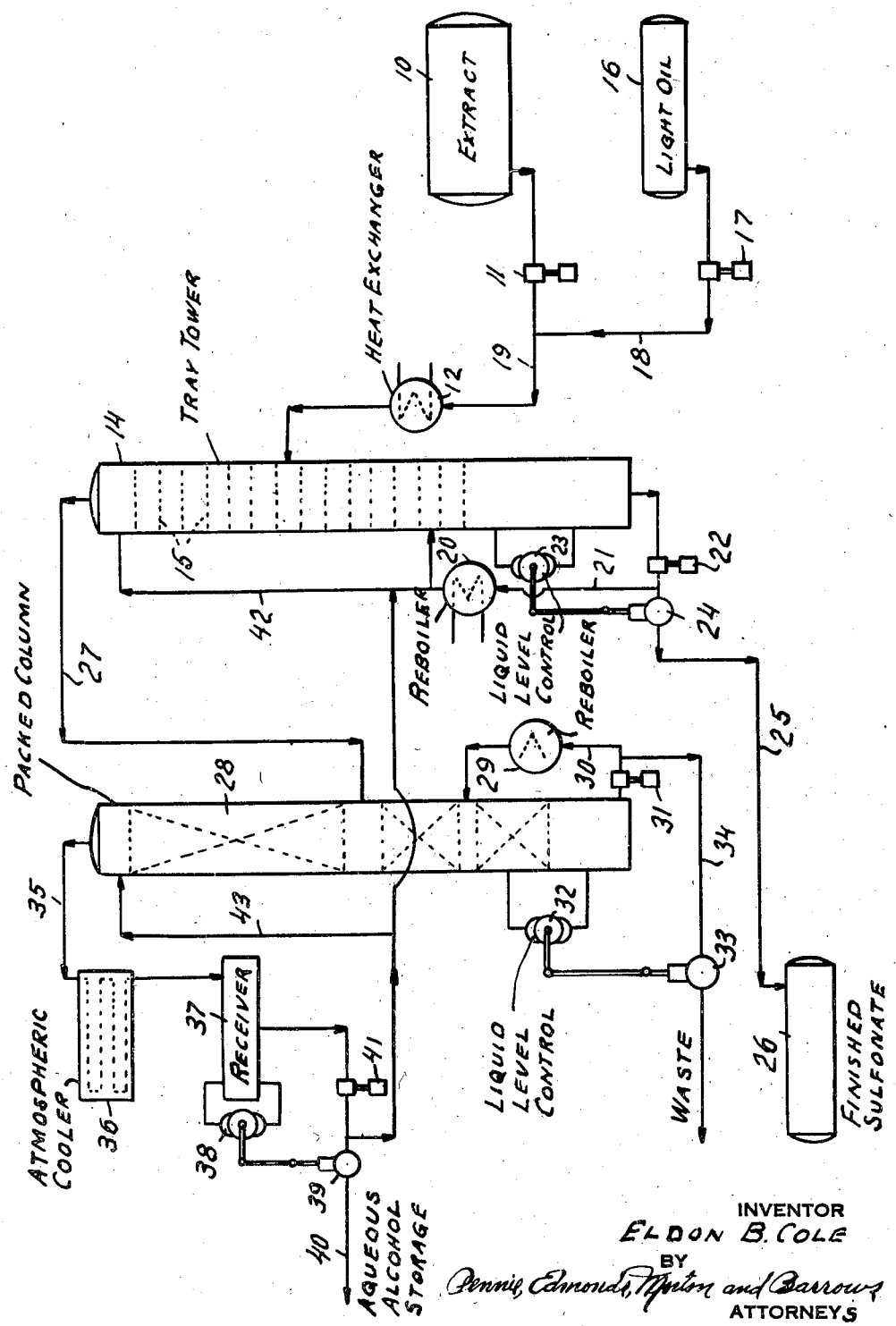
INVENTOR
ELDON B. COLE
BY
Pennie, Edmonds, Morton and Barrows
ATTORNEYS Patented Feb. 8, 1949

2,461,371

UNITED STATES PATENT OFFICE 2,461,371

DISTILLATION OF AQUEOUS ALCOHOL EXTRACTS OF MAHOGANY SULFONATES

Eldon B. Cole, Tulsa, Okla., assignor to Sinclair Refining Company, New York, N. Y., a corporation of Maine Application November 1, 1947, Serial No. 783,497

3 Claims. (Cl. 202—40)

I have invented a continuous process whereby aqueous alcohol extracts of oil soluble petroleum sulfonates can be reduced by distillation to a residue containing as little as 1% or less of water and as little as 10% oil. The process assures a consistent and uniform yield of product and as it is virtually automatically controlled it is easily operated by a single individual.

Heretofore, the distillation of such extracts to a residue essentially free of water and having a low content of oil has been fraught with difficulties because mahogany sulfonates are in reality soaps and accordingly exhibit a great affinity for water in which they become colloidally dispersed. The ordinary batch distillation of these extracts as proposed in the literature is most laborious and tediously slow because as the distillation proceeds the alcohol rapidly distills leaving a residue consisting of an extremely viscous mass of sulfonate and water which at times has a liver-like consistency and which at best behaves as a foaming soap solution. Such a residue presents a constant threat to "puking" or foaming over of the still unless the distillation is carried out at an interminably slow rate.

I once attempted some batch reductions of aqueous alcohol extracts from white oil manufacture containing from 25–30% sulfonate and oil and from 70–75% aqueous isopropyl alcohol together with small amounts of alkali metal salt and/or alkali metal hydroxide. I found that it was almost impossible by batch operation to reduce these extracts without excessive foaming, although some improvement resulted when air or steam was introduced into the foaming liquid to break the emulsion. These latter expedients, however, required constant attention. Moreover, the introduction of air caused the formation of carboxylic acids by reaction with the sulfonate, while the steam could only be used above 220° F. I considered using mechanical agitators in the still but decided against this because of the expense, not only in connection with the original installation but from the standpoint of maintenance. Also, I had doubts that the employment of mechanical agitators would appreciably affect the rate of reduction. I tried the addition of a light naphtha in one batch experiment thinking that this might reduce foaming but the resulting product was of an inferior quality probably due to the prolonged heating required. In this experiment, 350 gallons of extract containing a total of 245 gallons of water and alcohol was charged to a 420 gallon still. It required 48 hours to remove the alcohol and water.

In accordance with the invention, I eliminate the conditions responsible for the foaming over and, consequently, the slow rate of distillation by maintaining the residue in the distillation tower at a temperature above the boiling point of water at all times and by refluxing the tower with a mixture of water and alcohol containing from 30 to 90% alcohol.

My process is particularly valuable as applied to aqueous alcohol extracts of oil soluble petroleum sulfonates from white oil manufacture. White oil is manufactured from petroleum fractions of a viscosity similar to that of lubricating oils by exhaustive treatment of the fraction with fuming sulfuric acid followed by neutralizing, usually with aqueous caustic soda, extracting with aqueous alcohol to remove oil-soluble sulfonate, water washing and drying. Isopropyl alcohol is normally used in the extraction step but other low molecular weight alcohols, such as ethanol, can be used. The alcohol-water extraction mixture may contain equal volumes of alcohol and water, or it may be desirable to use a larger proportion of either alcohol or water. I have found that in batch reductions the most difficult extracts to reduce are those containing a greater volume of water than alcohol. The process of my invention, which I shall now describe in detail with the aid of the accompanying flow diagram, is applicable to the reduction of the extract irrespective of the alcohol employed in the extraction or of the proportions of sulfonate, alcohol and water in the extract.

Referring to the drawing, aqueous alcohol extract from storage tank 10 is pumped by pump 11 through heat exchanger 12 and thence to evaporating tower 14 provided with a suitable number of spaced perforated trays 15 which may be of conventional construction. Simultaneously, light oil having a boiling point above 212° F. at atmospheric pressure is withdrawn from storage tank 16 by pump 17 and charged via line 18 to line 19. This dilution of the extract with light oil may not be essential in all cases, but is recommended because the light oil serves to reduce the viscosity of the residue in tower 14 and thereby contributes to the efficiency of the process.

The material charged to the tower 14 is preheated in the exchanger 12 to a temperature above the boiling point of water at the operating pressure. In a typical operation conducted at a pressure only sufficient to maintain fluid levels and to provide for normal pressure drop through the system, the residue in the tower is maintained between 225 and 275° F. and the extract or the extract-light oil mixture is raised to approximately the same temperature in the exchanger. Reboiler 20 in line 21 is operated to maintain the temperature of the residue which is circulated through the reboiler by pump 22. A liquid level control 23 controls valve 24 in line 25 extending to product storage tank 26. The rate of charge to the tower is normally so related to the operating temperature that the material conveyed to tank 26, which material comprises the major portion of the diluent oil, when used, is essentially completely free of water and alcohol.

The overhead product of the tower 14 comprising water and alcohol is conveyed via line 27 to packed column 28 which is operated at a temperature adapted to produce a distillate of substantially pure aqueous alcohol. Tower 28 is maintained at the necessary temperature by circulation of residue through reboiler 29 in line 30, the flow being in the direction of the arrows and being maintained through the agency of the pump 31. A liquid level control 32 controls valve 33 in line 34 providing exit to the bottom product of the tower which may be passed to sewage.

The distillate in the case of tower 28 is passed via line 35 to atmospheric cooler 36 wherein the vapors are condensed, and thence to receiver 37 provided with liquid level control 38 controlling valve 39 in line 40 extending to a tank, not shown, for aqueous alcohol storage. Reflux for towers 14 and 28 is withdrawn from receiver 37 by means of pump 41, being introduced into the towers via lines 42 and 43 respectively. Water, alcohol or aqueous alcohol may be charged to line 42 whenever required to adjust the alcohol content of the reflux to tower 14, but this is usually unnecessary. The reflux ratio in the case of each tower is chiefly determined by the through-put and the cleanness of separation desired. However, the reflux ratio with respect to tower 14 should never be such that the alcohol content of the material in the upper portion of the tower is less than 30%.

In an actual plant operation conducted according to the invention, the extract worked, amounting to 6,678 gallons, had the following analysis:

| | Per cent |
|---|---|
| Sodium sulfonates and oil | 29.1 |
| Isopropanol | 20.5 |
| Water | 50.4 |

This material included extract obtained by water-washing the neutralized oil subsequent to extraction with aqueous alcohol. Reduction to a product essentially free of water and alcohol and containing only 20% oil was achieved in 57 hours. No diluent oil was required. The following is descriptive of the operation.

Operating temperatures having been established and with the system in equilibrium, the extract was withdrawn from storage tank 10 at an average rate of 117.1 gallons per hour, entering exchanger 12 at a temperature of from 65 to 70° F. and leaving the exchanger at a temperature of about 230° F. By circulation through reboiler 20, the temperature of the residue in tower 14 was increased to a temperature within the range 280–320° F. from a temperature of 225–275° F. Finished sulfonate entered storage tank 26 at an average rate of 33.9 gallons per hour. In the case of tower 28, the residue circulated through reboiler 29 entered the reboiler at a temperature of about 212° F. and was heated therein to a temperature of about 222° F. About 47.5 gallons of this residue was discharged to sewage each hour. The temperature at the top of tower 28 was determined by the volume of reflux introduced through line 43, ranging from 185–190° F. The distillate contained an average of 68% isopropanol by volume. The volume of reflux was automatically controlled. The reflux rate to tower 14 was maintained at approximately 85 gallons per hour, equivalent to at least 50% of the volume of the distillate exiting via line 27. The rate of withdrawal of aqueous alcohol from receiver 37 averaged 35.3 gallons per hour. Only 21 gallons of material was lost over the entire period of operation.

I claim:

1. Method of continuously distilling an aqueous alcohol extract of an oil-soluble mahogany sulfonate to remove the alcohol and water and to thereby produce a concentrate of the sulfonate comprising maintaining the residue in the distillation column at a temperature above the boiling point of water at the operating pressure and refluxing the column with a water-alcohol mixture containing between about 30 and 90% alcohol.

2. Method of continuously distilling an aqueous alcohol extract of an alkali metal mahogany sulfonate to remove the alcohol and water and to thereby produce a concentrate of the sulfonate, the extract having been derived from white oil manufacture, which comprises maintaining the residue in the distillation column at a temperature above the boiling point of water at the operating pressure and refluxing the column with a water-alcohol mixture containing between about 30 and about 90% alcohol.

3. Method of continuously distilling an extract of sodium mahogany sulfonate to produce a concentrate of the sulfonate, the extract containing water and isopropyl alcohol and having been derived from white oil manufacture, which comprises maintaining the residue in the distillation column at a temperature above the boiling point of water at the operating pressure and refluxing the column with a mixture of water and isopropyl alcohol containing between about 30 and about 90% alcohol.

ELDON B. COLE.

REFERENCES CITED

The following references are of record in the file of this patent:

UNITED STATES PATENTS

| Number | Name | Date |
|---|---|---|
| 1,087,888 | Petroff | Feb. 17, 1914 |
| 1,387,868 | Robinson | Aug. 16, 1921 |
| 2,316,670 | Colgate et al. | Apr. 13, 1943 |
| 2,334,532 | Archibald | Nov. 16, 1943 |
| 2,406,763 | Griesinger | Sept. 3, 1946 |
| 2,412,916 | Showalter | Dec. 17, 1946 |
| 2,414,773 | Showalter | Jan. 21, 1947 |